United States Patent
Watanabe

(10) Patent No.: US 7,094,864 B2
(45) Date of Patent: Aug. 22, 2006

(54) PROCESS OF CONTINUOUSLY PRODUCING POLYESTER POLYMER

(75) Inventor: Jun Watanabe, Ohtake (JP)

(73) Assignee: Daicel Chemical Industries, Ltd., Osaka (JP)

(*) Notice: Subject to any disclaimer, the term of this patent is extended or adjusted under 35 U.S.C. 154(b) by 0 days.

(21) Appl. No.: 10/500,692

(22) PCT Filed: Jan. 8, 2003

(86) PCT No.: PCT/JP03/00086

§ 371 (c)(1),
(2), (4) Date: Jul. 2, 2004

(87) PCT Pub. No.: WO03/059985

PCT Pub. Date: Jul. 24, 2003

(65) Prior Publication Data

US 2005/0080226 A1   Apr. 14, 2005

(30) Foreign Application Priority Data

Jan. 11, 2002 (JP) ............................. 2002-005387
Jan. 11, 2002 (JP) ............................. 2002-005388

(51) Int. Cl.
*C08G 63/08* (2006.01)
*C08F 6/00* (2006.01)

(52) U.S. Cl. ...................... 528/354; 528/272; 528/355; 528/357; 528/358; 528/359; 525/181; 525/183; 525/408; 525/411; 525/413; 525/415

(58) Field of Classification Search ................ 528/272, 528/354, 359, 357–358, 355; 525/408, 411, 525/413, 415, 183, 181
See application file for complete search history.

(56) References Cited

U.S. PATENT DOCUMENTS

| 5,403,897 | A | * | 4/1995 | Ebato et al. ................. 525/444 |
| 5,457,144 | A | | 10/1995 | Holy et al. |
| 5,484,882 | A | | 1/1996 | Takada et al. |
| 5,525,671 | A | * | 6/1996 | Ebato et al. ................... 525/53 |
| 5,656,700 | A | | 8/1997 | Kagi et al. |
| 5,777,027 | A | | 7/1998 | Endo et al. |
| 5,844,066 | A | | 12/1998 | Kakizawa |
| 6,228,488 | B1 | | 5/2001 | Tang et al. |
| 6,326,458 | B1 | * | 12/2001 | Gruber et al. ............... 528/354 |
| 6,362,308 | B1 | * | 3/2002 | Pham .......................... 528/354 |
| 6,831,149 | B1 | * | 12/2004 | Newman et al. ............ 528/354 |

FOREIGN PATENT DOCUMENTS

| EP | 0425708 A1 | 5/1991 |
| EP | 0618250 A1 | 10/1994 |
| EP | 0661325 A2 | 7/1995 |
| EP | 0697427 A2 | 2/1996 |
| JP | 8-003305 A | 1/1996 |

OTHER PUBLICATIONS

Wagen Und Dosieren, Verlagsgesellschaft Keppler, vol. 29, No. 2, Mar. 1998, pp. 6-14.

* cited by examiner

*Primary Examiner*—P. Hampton Hightower
(74) *Attorney, Agent, or Firm*—Birch, Stewart, Kolasch & Birch, LLP

(57) ABSTRACT

The present invention uses a reactor that combines devices having a special portion structure to solve the difficulty of uniform blending due to the reactants becoming highly viscous, the difficulty of heat removal, and the increase in pressure loss, thus leading to continuous production of a polyester-based polymer stably having excellent quality.

15 Claims, No Drawings

PROCESS OF CONTINUOUSLY PRODUCING POLYESTER POLYMER

TECHNICAL FIELD

The present invention relates to a process of continuously producing a polyester-based polymer that involves subjecting to ring opening polymerization of one or more species of cyclic esters with a polymer having hydroxyl groups and/or ester linkages to yield a copolymer by means of a reactor comprising a column-type agitating mixer having two or more shafts of agitation and a static mixer connected to an outlet thereof.

In addition, the present invention relates to a process of continuously producing a copolymer that comprises subjecting to ring opening polymerization of one or more species of cyclic esters with a polymer having hydroxyl groups and/or ester linkages to yield a copolymer by means of different static mixers connected in series as a reactor.

BACKGROUND ART

Homopolymers that use as a monomer dilactide or diglycolide, i.e. intermolecular dehydration cyclic esters of hydroxy acids, homopolymers that utilize as monomers lactones of intramolecular cyclic esters and copolyers of these monomers (hereinafter, simply referred to as polyester-based polymers) are decomposed by light, heat, enzymes or the like and taken in the recirculation to nature, and thus they have been subjected to many studies as biodegradable polymer materials from the viewpoint of safeness and environmental pollution control.

It has been known that processes for manufacturing homopolymers of dilactide or diglycolide are roughly classified into two types of manufacturing methods. Namely, they are a process that includes directly subjecting a corresponding hydroxycarboxylic acid to dehydration polycondensation to produce a polymer and a process that involves once synthesizing a dehydration cyclic ester of a hydroxy acid and then subjecting the resulting ester to ring opening polymerization to manufacture a polymer.

It is difficult for the former, the direct polycondensation method, to produce a polymer with a molecular weight of 4,000 or more ("Lactic Acid" written by C. H. Halten, p. 226, Veriag Chemie, 1971) and studies on conditions in reacting operation for high degrees of polymerization have resulted in, at most, a molecular weight of about 20,000 as shown in JP 02-52930 B. For this reason, when a still further higher-molecular weight polymer is needed, the latter, the ring opening polymerization method of a cyclic ester, has been utilized.

In addition, for processes of continuously manufacturing polyester-based polymers using such lactides and lactones, continuously manufacturing processes using aromatic polyesters and lactones are disclosed in JPs 61-281124A, 61-283619A and 61-287922 A.

Any of these processes include a reaction system by means of a dynamic mixer using a reactor having there in a screw or a paddle-type agitating blade such as a kneader or an extruder and subsequently delivering the polymer inside step by step from an inlet for charging raw materials to a product outlet. They disclose that these techniques enable the completion of reaction in a short time. Mixing operation using such a dynamic mixer, however, cannot prevent a temperature rise due to heat liberation by shear in a final stage of reaction that involves a high-viscosity polymer, while reduction of the agitation speed for avoidance of the heat liberation may cause insufficient mixing in early stages. Additionally, for completing the reaction in a short time mentioned above, an operation such as increasing the reaction temperature or increasing the amount of catalyst is inevitably required, and therefore, in addition to a similar problem, it inversely affects the water resistance of the polyester-based polymer. Furthermore, in order to prevent, for example, the leakage of cyclic esters evaporated by heating or shearing heat liberation to the outside of a system, the methods need to enhance the sealability in agitating shafts, or dispose a portion having an extremely high shearing stress for boosting the sealability by the polymer itself, and so the techniques are not suitable.

Also, with methods for continuously producing polyester-based polymers from lactides, JP 5-93050 A discloses a continuous polymerization method, a so-called CSTR continuous manufacturing process, in which raw materials in a reaction are continuously fed to a plurality of agitating vessels in series to take as the reaction time a residence time of the material from an initial reaction vessel to a final reaction vessel. However, any of these relates to a reactor using a dynamic mixer and does not teach or suggest methods that solve the difficulty in uniform agitation due to increase in viscosity of reactants, which is a problem during continuous production of a high-molecular-weight polyester-based polymer from lactides or lactones, and the difficulty in heat removal.

In other words, even further addition of a method of manufacturing a polyester-based polymer from lactides as disclosed in each technique supra leads to the difficulty in agitation by a normal mixer and sometimes to the difficulty in even taking out the reaction contents in that the molecular weight of the polymer formed is increased, with the polymer viscosity increased to a very high viscosity range of 10,000 poise to hundreds of thousands of poise. In addition, even though the reaction system is agitated using a strong mixer having a devised mixing blade, the reaction contents give rise to the movement such as a laminar flow caused by the rotation of the agitating blade, which makes it difficult to uniformly perform blend in an entire system.

Additionally, accompaniment of heat liberation by ring opening polymerization of a cyclic ester renders difficult the temperature control within the reaction vessel on account of the difficulty of homogeneous agitation along with increased viscosity, thereby leading to an uncontrollable reaction, or to the generation of a temperature distribution in the polymer to deteriorate the quality due to local heating.

As described in JPs 7-26001 A and 7-149878 A, static mixers (SMs) without a dynamic mixer have started being used to solve these problems; however, a non-moving mixing element fixed through a tube has a structure for repeating the splitting, conversion and inversion of the flow, which shows a very large resistance to a fluid itself. In other words, the pressure loss in a reaction system becomes very large, thereby making difficult the designing of a reactor and a pump, etc. Also, the production capacity is lowered due to the upper limit of the discharge pressure.

In addition, the SM is not provided with a movable section of controlling mixing, or shearing force and is allowed to be optimally designed only for certain specific operational conditions. Hence, for other cases and thus most operational conditions, the SM cannot control mixing and must be operated while constantly accompanying a certain extent or more of mixing failure and heat distribution.

Furthermore, when the aperture of the SM, that is, the sectional area for the fluid to pass through is enlarged in order to reduce a high pressure loss, the mixing failure and the heat distribution become remarkably large. Mixing failure increases the time required for stabilizing the physical properties of a product to be discharged from the start of operation and lengthens the residence time necessary for reaching a target conversion of a reaction, thereby causing instability of properties of the product.

To avoid this, when the SM is sometimes used as a loop type continuous reacting apparatus, the mixing effect is increased with increasing the number of loops while a distribution of the residence time through the reactor is proportionally enlarged. As a result, the deteriorations in polymer qualities due to decomposition and discoloration caused by heat subjection for a long while are unavoidable. In particular, in the production of a copolymer of a polymer having hydroxyl groups and/or ester linkages with a cyclic ester, the molecular weight distribution is broadened and further the uniformity of the segment length in each block is decreased as the transesterification proceeds, which in turn causes adverse affects such as broadening of crystal peaks measured by DSC. Also, increase in flow volume in the loop section makes the facilities very large, which renders the cost of the facilities high and makes the reactor not practical.

On the other hand, to avoid a problem concerning mixing in early stages, a method is proposed which involves previously preparing a homogeneous solution using a solvent etc., or conducting preliminary polymerization by means of an agitation type reaction vessel having a mixer. However, mixing of raw materials for a polymer which are a solid or a high viscous liquid at a handling temperature with a cyclic ester require long-duration treatment under heating conditions, which cannot avoid a problem similar to the problem occurring in the above-mentioned loop type continuous reactor as a reaction proceeds.

In particular, polyester-based polymers produced from these cyclic esters have an excellent property in biodegradability, while they are susceptible to hydrolysis caused by acids, alkalis, or water and also have a property of being readily subjected to molecular-weight reduction by heat. For example, in GUPTAM, C, Colloid Polym. Sol. (DEU) 260 (3) 308–311, 1982, a study on thermal decomposition rates of homopolymers of dilactide by heat-up thermogravimetric analysis in air is reported which shows that molecular-weight reduction acceleratedly occurs even in a sealed reaction vessel for the case at an elevated temperature of 250° C. or higher.

In addition, homopolymers and copolymers of dilactide are susceptible to progress in discoloring when exposed to high temperature. In other words, the conventional manufacturing methods using such cyclic esters cannot attain uniform blending because of an increase in viscosity accompanying increase in the molecular weight of the polymer, thus effecting partial deterioration due to local heating leading to creation of the problem of decline in qualities. Aside from a small-scale experiment in a laboratory, large-scale industrial production requires a preferable manufacturing method.

As described above, when producing a polyester-based polymer, uniform agitation is difficult to be performed due to the reaction system becoming highly viscous, which sometimes leads to the occurrence of thermal decomposition, discoloration, etc, as well as decline in qualities of a polymer formed and decrease in production capacity on account of a high pressure loss. Also, because blending in early stages of reaction of a polymer having hydroxyl groups and/or ester linkages with a cyclic ester, i.e. raw materials, is difficult to be performed, an economically disadvantageous process has been enforced.

The present invention solves the difficulty of uniform agitation due to increase in viscosity of reactants, which is a problem during industrial production of a high-molecular-weight polyester-based polymer, the difficulty of uniform blending of a highly viscous raw material and low viscous raw material, the difficulty of heat removal, and productivity reduction on account of a high pressure loss, and provides a process of continuously producing a polyester-based polymer having excellent quality.

DISCLOSURE OF THE INVENTION

The present inventors have intensively investigated, considering the aforementioned problems, a method of agitating and blending a polymer having hydroxyl groups and/or ester linkages, a cyclic ester and a polyester-based polymer which is a reaction product thereof, a method of reducing the pressure loss, and further a method of continuous production thereof; as a result, it has been found out that utilization of a reactor composed of a column-type agitating mixer of two or more shafts of agitation and a static mixer connected to the outlet thereof enables good blending of reaction contents even with the viscosity of a polymer solution being high, an efficient removal of the polymerization heat, a stable operation with a small pressure loss, and obtainment of a high-molecular-weight polymer without decomposition and discoloration with high quality, high efficiency, and high productivity, thereby leading to the completion of the present invention.

In addition, the present inventors have intensively investigated, considering the aforementioned problems, a method of agitating and blending a polymer having hydroxyl groups and/or ester linkages, a cyclic ester and a polyester-based polymer which is a reaction product thereof, a method of reducing the pressure loss, and further a method of continuous production thereof; as a result, use of a continuous reactor having at least two or more types of static mixers connected in series enables good blending of reaction contents even with the viscosity of the polymer solution being high, an efficient removal of the polymerization heat, a stable operation with a small pressure loss, and obtainment of a high-molecular-weight polymer without decomposition and coloring with high quality, high efficiency, and high productivity, thereby leading to the completion of the present invention.

Therefore, according to a first aspect of the present invention, there is provided a process of producing a polyester-based polymer, characterized by including continuously feeding a polymer (A) having hydroxyl groups and/or ester linkages and one or more species of cyclic esters (B) into a reactor comprising a column-type agitating mixer having two or more shafts of agitation and a static mixer connected to an outlet thereof and then subjecting them to ring opening polymerization, to obtain a copolymer (C).

According to a second aspect of the present invention, there is provided the manufacturing process described in the first aspect of the present invention, wherein the polymer (A) is a crystalline aromatic polyester.

According to a third aspect of the present invention, there is provided the manufacturing process described in the first or second aspect of the present invention, wherein the cyclic ester (B) is a lactone.

According to a fourth aspect of the present invention, there is provided the manufacturing process described in the third aspect of the present invention, wherein the lactone is ε-caprolactone.

According to a fifth aspect of the present invention, there is provided the manufacturing process described in any of the first to fourth aspects of the present invention, wherein the conversion of reaction of the cyclic ester (B) is 75 mole % or less after passing through the tower-type agitating mixer having two or more shafts of agitation, and before passing through the static mixer, and it is 75 mole % or more after passing through the static mixer.

According to a sixth aspect of the present invention, there is provided a process of continuously producing a polyester-based polymer, characterized by continuously feeding a polymer (A) having hydroxyl groups and/or ester linkages and one or more species of cyclic esters (B) into a continuous reactor having a static mixer and then subjecting them to ring opening polymerization to obtain a copolymer (c) in which:

the continuous reactor at least comprises a static mixer (SM(i)) for use in an initial stage of reaction and a static mixer (SM(e)) for use in a final stage of reaction, the static mixer (SM(e)) being connected to SM(i) in series and being a type different from that of SM(i);

the X (i:e) value is 4 or greater, the value being calculated by substituting the pressure loss ratios Zi of SM(O) and Ze of SM(e) and the inside diameters Di of SM(i) and De of SM(e) into Equation (1) below:

$$X(i:e)=(Zi \times De^4)/(Ze \times Di^4) \qquad (1)$$

According to a seventh aspect of the present invention, there is provided the continuously manufacturing process described in the sixth aspect of the present invention, wherein the X(i:e) is 10 or greater.

According to an eighth aspect of the present invention, there is provided the continuously manufacturing process described in the sixth or seventh aspect of the present invention, wherein the Y(i) value is from 200 to 2,000, the value being calculated by substituting the pressure loss ratio Z(i), the mixer length L(i) and the inside diameter D(i) of SM(i) into Equation (2) below:

$$Y(i)=Z(i) \times L(i)/D(i) \qquad (2)$$

According to a ninth aspect of the present invention, there is provided the continuously manufacturing process described in the sixth aspect of the present invention, wherein the Y(i) is from 500 to 1,000.

According to a tenth aspect of the present invention, there is provided the continuously manufacturing process described in any of the sixth to ninth aspects of the present invention, wherein a static mixer (SM(m)) for use in the intermediate stage of reaction is optionally placed between the SM(i) and the SM(e).

According to an eleventh aspect of the present invention, there is provided the continuously manufacturing process described in any of the sixth to tenth aspects of the present invention, wherein one or more or all of the SM(i), the SM(m) is optionally placed, and the SM(e) comprise a plurality of static mixers.

According to a twelfth aspect of the present invention, there is provided the continuously manufacturing process described in any of the sixth to eleventh aspects of the present invention, wherein for static mixers [SM(r), (r=1 to n)] to the total of n pieces, constituting the SM(i), the SM(m) optionally placed, and the SM(e), the total value of Yr calculated using Equation (2) (i.e., ΣYr=ΣZr×Lr/Dr, (the range of Σ being r=1 to n)) is 5,000 or less.

According to a thirteenth aspect of the present invention, there is provided the continuously manufacturing process described in any of the sixth to twelfth aspects of the present invention, wherein the polymer (A) is a crystalline aromatic polyester.

According to a fourteenth aspect of the present invention, there is provided the continuously manufacturing process described in any of the sixth to thirteenth aspects of the present invention, wherein the cyclic ester (B) is a lactone.

According to a fifteenth aspect of the present invention, there is provided the continuously manufacturing process described in the fourteenth aspect of the present invention, wherein the lactone is α-caprolactone.

Hereinafter, the present invention will be described in detail.

BEST MODE FOR CARRYING OUT THE INVENTION

In the present invention, a copolymer (C) is also referred to as a polyester-based polymer (C) or simply a polymer (C).

First, a reactor used for the first to fifth aspects of the present invention will be described. A reactor (called an agitating mixer (I)) comprising a column-type agitating mixer of two or more shafts of agitation in the first to fifth aspects of the present invention refers to an apparatus having at least a port for supplying raw materials and a discharging port that discharges a polymer in a melt state, in which two or more shafts of agitation placed within a tubular vessel or a vessel combining the same type in parallel are each connected to the power section such as the motor and in which agitation is performed by causing each of the shafts of agitation to rotate in the same direction or in the opposite directions. The shape, etc. are not particularly limited and the apparatus is disposed vertically, slantly or horizontally for use. The apparatus may be designed to have a gas phase portion when it is placed horizontally. The shafts of agitation are provided with an agitating blade such as a paddle for mixing and, for example, shafts of agitation in which spacing between the tip of the paddle, other shafts of agitation, and the tube wall is strictly adjusted, i.e. one having self-cleaning ability, is preferable.

Specific examples of the agitating mixer (I) include an extruder of two screws or more, preferably a twin screw extruder, i.e. a co-rotating extruder or counter-rotating extruder, particularly preferably a co-rotating intermeshing twin screw extruder. In the extruder, the ratio L/D of screw length (L) to diameter (D) or the like of an extruder is not particularly limited. Such the extruder includes, for example, a combination of a plurality of screw portions with a fixed screw type paddle and screw portions with a fixed kneading disk type paddle. The screw type paddle has a main function of transporting materials to the inside of a cylinder and mixing ability, and the kneading disk type paddle has mixing ability and, in some cases, the ability to liberate heat and melt a solid raw material by applying shear. A kneading disk type paddle has a cross section perpendicular to the screw of, for example, a convex lens shape or a polygonal shape of a quasi-triangle or a higher polygonal shape and is a pillar-like flat paddle or a helical paddle with slight twisting in some cases.

Other specific examples include a kneader essentially specialized for mixing function such as a KRC kneader available from Kurimoto Ltd. These kneaders are generally, like an extruder, a combination of a screw type paddle and a kneading disk type paddle, particularly primarily a combination of kneading disk type paddles. These kneaders can be made to have a large inside volume, while they are used in many cases with L/D being 20 or less. When a raw material is in a solid state, it is preferably fed to the apparatus of the present invention after being separately heated and melted.

Still other usable examples may be, specifically, a polymerizing apparatus of a surface renewal type. Specific examples include a polymerizing device having glass blades and a polymerizing apparatus having lattice blades available from Hitachi Ltd., SCR and New SCR available from Mitsubishi Heavy Industries Ltd., and a Bipolak available from Sumitomo Heavy Industries Ltd.

These agitating mixers (I) are usually used with a gas phase portion provided. However, in the present invention, with concern to a short pass of an unreacted cyclic ester (B), the mixer is operated in a state with liquid filled to the top, or the residence time within the agitating mixer (I) is shortened with respect to the residence time including that of the static mixer as described infra, for the reduction of its influence. In addition, a method may be used that involves slantly disposing the agitating mixer (I) itself to actively remove a gas phase portion near the discharge port. When it is a solid raw material, it is preferably supplied to the apparatus after being separately heated and melted.

A static mixer as used herein refers to a mixing device without a movable section with respect to a mixing device having a dynamic mixer, and thus a static mixing device without a dynamic mixer. More specifically, a static mixer is a mixing device consisting of a mixing element without a movable section normally fixed to the tube and in the tube, which mixes fluids by the repetition of splitting of the flow, conversion and inversion of the flow direction, and splitting, conversion and inversion of the flow in the vertical and horizontal directions. Some static mixers depending on their type are provided with a jacket for heat exchange on the periphery of the tube and some are equipped with a heat exchanging tube that passes a heating medium through the mixing element itself.

According to the first to fifth aspects of the present invention, a raw material fluid is fed into a static mixer using a pump or the like, and the static mixer is used as a part of the reactor and also for mixing raw materials or a formed polymer. On the other hand, according to the sixth to fifteenth aspects of the present invention, as discussed later on, use of a plurality of different types of static mixers (having different shapes of static agitating blades called mixing elements, or different inside diameters even if the blade shapes are similar) is essential for the main section of the reactor.

In the production of a polyester-based polymer (C) according to the first to fifth aspects of the present invention, use of a static mixer having a small shearing stress as well as acting uniformly is particularly preferable in a high viscosity range of a resin that exceeds 10,000 poise inasmuch as agitation heat resulting from the agitation shearing stress as well as polymerization heat are vigorously generated, so that dynamic agitation fiercely liberates local heat in the agitating portion.

In addition, static mixers are usually tubular, and a plurality of static mixers connected in series continuously supply raw materials and a low-molecular-weight copolymer formed in the agitating mixer (I) from the supply port under an inert gas atmosphere and allows the reaction to continuously proceed without contact with the exterior atmosphere by continuously moving the reactant within the static mixer. Thus, the apparatus continuously permits from charge to reaction, recovery of unreacted monomers (B) via removal of low-boiling materials of polymer and oligomers thereof and solvent used as required, and pelletization of the polymer.

This is an advantage not obtainable in the production by means of a conventional batch type reactor, and the method is extremely suitable for a process for manufacturing a decomposable polymer that is particularly decomposed by oxygen, moisture, and further by light although dependent on the polymer. That is, for dynamic agitation only, the more the agitating power is increased in order to enhance the homogeneous mixability of a high-viscosity polymer, the more the agitation heat is increased, and thus the decomposition of the polymer proceeds. The present invention has solved this problem by use of the agitating mixer (I) and a static mixer connected to the outlet thereof.

In addition, a static mixer can control the temperature of the inside of a reactor by mounting a heat exchanger on the outside of the tube. Also, further, the temperature inside the reactor can be more efficiently controlled by flowing a medium through the mixing element itself inside to obtain a wider heat exchange area.

Static mixers used in the present invention more specifically and preferably include, for example, a Sulzer type static mixer, a Kenics type static mixer, and a Toray type static mixer. In production of a polymer having a large amount of polymerization heat liberation, especially production of a biodegradable polyester-based polymer that becomes high in viscosity, a Sulzer SMR type is particularly preferred, which has a medium flow passage for heat exchange imbedded in the mixing element itself of the static mixer.

Moreover, the mixing efficiency is proportional to the linear speed of a fluid. The number of mixing elements for obtaining a sufficient mixing effect is determined by the viscosity of a reaction fluid. In this case, the Reynolds number $Re=DU\rho/\mu$ [D: inside diameter of the tube (cm), U: flow rate inside the tube (cm/sec), $\rho$: density (g/cm$^3$), $\mu$: viscosity (g/cm sec)] of a reaction fluid in a static mixer is preferably $10^3$ or more as a common viscosity.

However, the present invention deals with a polymerization reaction associated with an extremely high viscosity and so the effect by a flow or the conversion of the direction by means of a static mixer is rather important. Hence, the number of mixing elements in the static mixer is not necessarily set based on the condition in which the Re number is $10^3$ or greater, but is dependent on the model of the static mixer to be used. Therefore, a static mixer to be used in the present invention is allowed to be constituted to have a combination of mixing elements and the total number of mixing elements is not particularly limited. However, the number of units is generally 5 to 40 and in many cases 10 to 25.

A reactor used in the first to fifth aspects of the present invention includes a column-type agitating mixer [agitating mixer (I)] having two or more shafts of agitation and a static mixer.

The static mixer itself does not have a transport capability, and thus the transport of materials requires a transport capability of a column-type agitating mixer having two or more shafts of agitation and, optionally, a pump such as a gear pump, or plunger pump, or an extruder having a function of heating and melting and having one or two or more shafts of agitation for delivering a reaction mixture or a polyester-based polymer during or subsequent to reaction.

In addition, when the raw material is a solid, it is made to be heated and melted (or dissolved with a cyclic ester) within the agitating mixer (I), or made to be separately heated and melted by means of an extruder, etc. and then supplied to the agitating mixer (I).

Now, a continuous reactor used for the sixth to fifteenth aspects of the present invention will be described.

A continuous reactor used for the sixth to fifteenth aspects of the present invention essentially consists of a static mixer only. Inasmuch as a static mixer itself does not have a transport capability, a pump or an extruder is used for charging raw materials and, optionally, the transport of a reaction mixture or a polyester-based polymer during or subsequent to reaction. Pumps include a gear pump and plunger pump, with an extruder having a function of heating and melting and having one or two or more shafts of agitation used for the charging of a raw material that is a solid polymer.

A batch/continuous reactor including an agitating reaction vessel and a static mixer communicated therewith and a circulating continuous reactor provided with a static mixer communicated in a loop form therewith require a long period of time with a heated state to obtain a sufficiently mixed state of a polymer (A) and a cyclic ester (B), which leads to a further noticeable decrease in uniformity caused by increase in viscosity with reaction progress and the remarkable extension of a residence time distribution, and therefore they are not preferable.

In the sixth to fifteenth aspects of the present invention the type of a static mixer being different means that the shape is different in a static agitating blade called a mixing element, or that the inside diameter D is different even though the shape is similar. Thus, a method by means of a continuous polymerization apparatus utilizing in series two or more static mixers having a similar agitating blade shape and the same diameter only as static mixers in early stages and static mixers in a final stage is not a method according to sixth to fifteenth aspects of the present invention.

In addition, individual static mixers constituting static mixers of the same reaction stage, e.g. $SM(i_1)$, $SM(i_2)$, etc., may be of the same type as, or of types different from each other, and also the same type, thus a type of the same static agitating blade shape and the same inside diameter, can be used for all the static mixers.

Additionally, individual static mixers constituting static mixers of each reaction stage can all be made to alter only in inside diameter in sequence from SM(i) to SM(m) to SM(e).

The types of these different static mixers are roughly classified into a type used in an early stage of reaction when a polymer (A) and a cyclic ester (B) are separately supplied, a type in a final stage of reaction immediately before a certain rate of reaction of the cyclic ester (B) is attained and the copolymer (C) that is the reaction product is taken out, or immediately before the cyclic ester (B) is transported to a subsequent step in which the main object is something besides the ring opening polymerization of the cyclic esters (B), and into a type in an intermediate stage of reaction where static mixers are optionally disposed between these two types of static mixers.

In the sixth to fifteenth aspects of the present invention, for the static mixer SM(i) used in the aforementioned early reaction stage and the static mixer SM(e) used in the final reaction stage, the value X(i:e) determined from each pressure loss ratio Zi and Ze, and the value of each inside diameter Di or De to the fourth power thereof needs to be 4 or larger, preferably 10 or larger.

$$X(i:e)=(Zi\times De^4)/(Ze\times Di^4) \qquad (1)$$

When X(i:e) is less than 4, the improvement of the early stage mixing and the reduction of pressure loss become difficult to achieve at the same time, and thus it is not preferable. The maximum value of X(i:e) is not particularly limited; however, when the value exceeds 100, attention must be paid to designing because each outer shape of the static mixers is very different and the entire pressure loss is increased depending on physical properties of a raw material to be blended therein. Therefore, the value is preferably 100 or less, more preferably 50 or less.

In the sixth to fifteenth aspects of the present invention, a static mixer SM(m) optionally used in the intermediate reaction stage is placed between SM(i) and SM(e), and each of X(i:m) and X(m:e), which are obtained using Equation (1) described above by substituting m for e or i, should be 1 or greater.

$$X(i:m)=(Zi\times Dm^4)/(Zm\times Di^4)$$

$$X(m:e)=(Zm\times De^4)/(Ze\times Dm^4)$$

Preferably, $X(i_j:e_k)$ is preferably 1 or more, obtained taking individual static mixers constituting actually connected SM(i) and SM(e) as $SM(i_1)$, $SM(i_2)$, ..., $SM(e_1)$, $SM(e_2)$, ..., respectively, the characteristic values of j pieces of static mixers belonging to the early reaction stage as $Zi_j$ and $Di_j$, and the characteristic values of k pieces of static mixers belonging to the final reaction stage as $Ze_k$ and $De_k$.

$$X(i_j:e_k)=(Zi_j\times De_k^4)/(Ze_k\times Di_j^4) \qquad (1')$$

In addition, a similar relation holds in the case where a static mixer SM(m) is, optionally, provided in the intermediate reaction stage. Also, when a plurality of SM(m)s, i.e. $SM(m_1)$, $SM(m_2)$, ..., are placed, each satisfies a similar relation.

In the sixth to fifteenth aspects of the present invention, the value Y(i) is 200 or more, preferably 500 or more, which is obtained from Equation 2 described below using the pressure loss ratio Z(i) of a static mixer SM(i) used in the early reaction stage, the mixer length L(i) and the inside diameter D(i). The maximum value is not particularly limited, but is usually 2,000 or less, preferably 1,000 or less. When this value is large, an effect on the pressure loss becomes anxious, which requires ideas in design such as placing delivering equipment such as a pump after an outlet of the static mixer SM(i), or SM(m), etc. On the other hand, when Y(i) is smaller than 200, the possibility of insufficient mixing in the early reaction stage is raised, which adversely affects the stability, thus requiring designing, taking into account an earlier uniform mixing, for a static mixer SM(m) or SM(e) connected subsequent to a static mixer SM(i) used in the early stage of reaction.

$$Y(i)=Z(i)\times L(i)/D(i) \qquad (2)$$

In the sixth to fifteenth aspects of the present invention, the total value of Yr [i.e. $\Sigma Yr=\Sigma Zr\times Lr/Dr$, (total range of $\Sigma$, r=1 to n)] is 5,000 or less, further preferably 2,500 or less, which is obtained in a manner similar to that described above with respect to all of the n pieces of static mixers [SM(r), (r=1 to n)] constituting SM(i), SM(e) and SM(m). When this value Yr is large, an affection on the pressure loss becomes anxious, which requires ideas in design such as placing delivering equipment such as a pump near an outlet of each static mixer and the like.

It is to be noted that in the sixth to fifteenth aspects of the present invention, equipments such as a pump may be disposed between static mixers of each reaction stage for the purpose of transport.

In the sixth to fifteenth aspects of the present invention, the pressure loss ratio Z of a static mixer of each reaction stage or each static mixer constituting the mixer is an inherent numerical value of the static mixer. The ratio is calculated from the ratio $\Delta P_m/\Delta P_o$ of the pressure loss value $\Delta P_m$ of a static mixer to the pressure loss value $\Delta P_o$ for the case where the same kind of fluid is made to flow into a hollow tube with the same diameter as that of the static mixer under the same flow rate conditions (Liquid Mixing Technology, edited by N. Harnby, translated by Koji Takahashi, The Nikkan Kogyo Shinbun Ltd.).

Therefore, the pressure loss ratio of a static mixer, which is presently unknown, can be determined in the same manner as above. For example, the pressure loss ratio of the Kenics type static mixer is 7, the pressure loss ratio of the Sulzer Corp. SMX is 38, the pressure loss ratio of the Sulzer Corp. SMXL is 7.8, and the pressure loss ratio of the Toray type static mixer is 38.

The pressure loss ratio of a static mixer used in the present invention is not particularly limited and is, for example, 5 to 300, more generally 7 to 40. A mixer of a large pressure loss ratio can be used in an early reaction stage, and a mixer with a low one can be used in a final reaction stage.

The inside diameter D is the inside diameter of a static mixer pipe in a static mixer generally used in the form of a tube where a mixer element is actually disposed and where a practical fluid is delivered. The mixer length L is the length of the element portion within a static mixer.

Subsequently, polymerization components that are starting materials of a polyester-based polymer (C) obtained by the manufacturing method of the present invention, will be discussed.

Cyclic esters (B) for use in the present invention include intermolecular cyclic esters of hydroxycarboxylic acids and lactones.

Lactones refer to those having an intramolecular cyclic ester structure, and specifically include ε-caprolactone, α,α-dimethyl-β-propiolactone, dodecanolactone, β-propiolactone, butyrolactone, valerolactone, 3-alkylvalerolactone, β, β-dialkylvalerolactone, lactones of hydroxycyclohexane carboxylic acid, isocumarin, cumarin, hydroxycumarin, and phthalide. Of these, ε-caprolactone is preferably used.

In the present invention, lactams as well as cyclic esters (B) are usable as well, and mixtures of cyclic esters (B) and lactams are also usable. Lactams refer to those having an intramolecular cyclic amide structure, and particularly include ε-caprolactam, δ-valerolactam, γ-butyrolactam, and β-propiolactam. Of these, ε-caprolactam, γ-butyrolactam, etc. are preferably used.

Cyclic esters (B) and lactams are singly subjected to ring opening polymerization to permit the production of polyester-based polymers, and are also allowed to copolymerize with intermolecular cyclic esters of one or more species of hydroxycarboxylic acids. In this case, the polymerization ratio of the intermolecular cyclic esters to the lactones can be made to vary depending on a target polymer, and selection of various combinations of the intermolecular cyclic esters and the lactones can provide them each with preferable properties. This is particularly useful for reducing crystallinity of a cyclic ester after polymerization for adjustment.

An intermolecular cyclic ester of the hydroxycarboxylic acids refer to those formed by subjecting two molecules of the hydroxycarboxylic acids of the same or different kinds to dehydration cyclic esterification between molecules. A typical example is expressed by Formula 1 shown below:

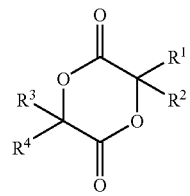

Formula 1

(wherein $R^1$, $R^2$, $R^3$ and $R^4$ are the same as, or different from, each other and each represents a hydrogen atom, a methyl group, or an ethyl group.)

The hydroxycarboxylic acids include lactic acid, glycolic acid, ethylglycolic acid, dimethylglycolic acid, α-hydroxyvaleric acid, α-hydroxyisovaleric acid, α-hydroxycaproic acid, α-hydroxyisocaproic acid, α-hydroxy-β-methylvaleric acid, α-hydroxyheptanoic acid, α-hydroxyoctanoic acid, α-hydroxydecanoic acid, α-hydroxymyristic acid, and α-hydroxystearic acid.

Cyclic esters from the same kinds of the hydroxycarboxylic acids include, for example, dilactides such as diglycolide (i.e. 1,4-dioxa-cyclohexane-2,5-dione, also simply called glycolides), dilactide (i.e. 1,4-dioxa-3,6-dimethylcyclohexane-2,5-dione, also simply called lactide), di (ethylglycolide), di (dimethylglycolide), L-dilactide and D-dilactide produced by cyclic esterifying each of L-lactic acid and D-lactic acid between two molecules, D,L-dilactide formed by cyclic esterifying two molecules of D,L-lactic acid, and MESO-dilactide produced by cyclic esterifying each molecule of L-lactic acid and D-lactic acid.

Cyclic esters from different hydroxycarboxylic acids include, for example, methylglycolide, α, α-dimethylglycolide, and trimethylglycolide or the like.

An intermolecular cyclic ester for use in the present invention is selected depending on the properties of a target polymer, and a combination of two or more species is usable. For example, even when a dilactide is used as a copolymer of a dilactide and diglycolide, not only is L-dilactide or D-dilactide simply used as a dilactide, but also two or more species of the dilactides selected from L-dilactide, D-dilactide, D,L-dilactide, and MESO-dilactide are used in combination with diglycolide to thereby realize more preferable resin properties in moldability, transparency and heat resistance in terms of the crystallinity of resins.

A method of charging a cyclic ester (B) includes heating and melting the ester to room temperature or higher when it is a liquid or to a temperature of liquefaction when it is a solid, and subsequently delivering the liquid using a plunger pump, gear pump, etc.

A cyclic ester (B) may be heated in advance in a heatable tank, or by means of a generally used heat exchanger, etc. For example, when a polymer (A) as described below has a melting point or a softening temperature, it is preferable to heat the polymer to that temperature or higher. However, when the polymer is good in solubility and does not solidify, the heating of the polymer may be performed at the temperature lower by 30° C. than the melting point. Specifically, the temperature is 125 to 300° C., more preferably 150 to 250° C.

As described above, the cyclic ester (B) heated may be fed by using a static mixer or piping at two or more sites including the early reaction stage to disperse the ester.

Oxygen and moisture in the cyclic esters are preferably removed in advance, and the esters are preferably maintained in a dried state after the removal. They can be decreased by usually used methods that include pressure reduction, inert gas purge, distillation, and adsorption.

A polymer (A) having hydroxyl groups and/or ester linkages for use in the present invention is a polymer that possesses at least a hydroxyl group or at least an ester linkage.

Examples of polymers having hydroxyl groups include a polyvinyl alcohol, starch, cellulose, and cellulose ether. Use of these readily provides a polymer similar to a graft polymer and use of a polyoxyalkylene ether is likely to give a polymer similar to a block polymer.

In addition, polymers with an ester linkage and without a hydroxyl group include a polyvinyl acetate, vinyl acetate/ethylene copolymers, polyacrylates, polyacrylate-based copolymers, and polycarbonates or the like.

Polymers having an ester linkage, having no hydroxyl group and having a carboxyl group at the terminal thereof include polyester amides, aliphatic polyesters, alicyclic polyesters, crystalline aromatic polyesters, and polyester-based elastomers having a crystalline aromatic compound as a primary component.

When a terminal hydroxyl group is absent, the rate of reaction becomes very slow, and thus a small amount of water or an additive as a promoter (alcohol or the like) is preferably added in order to hydrolyze a portion of the ester (a molecular-weight adjusting agent as described later on can be used for such an additive).

Polymers having hydroxyl groups and ester bonds include partially esterified cellulose esters, polyester amides, aliphatic polyesters, alicyclic polyesters, crystalline aromatic polyesters, and polyester-based elastomers having a crystalline aromatic compound as a primary component.

These can be used as a mixture of two or more species. Of these, the crystalline aromatic polyesters are particularly preferable.

A crystalline aromatic polyester is primarily made of one or more aromatic dicarboxylic acids selected from terephthalic acid, isophthalic acid, 2,6-naphthalenedicarboxylic acids or the like, and/or 4-hydroxybenzoic acid, or 6-hydroxy-2-naphthoic acid, and one or more aliphatic diols selected from ethylene glycol, propylene glycol, 1,3-propanediol, 1,4-butanediol, pentanediol, hexanediol, octanediol, neopentyl glycol, cyclohexane dimethanol, hydrogenated bisphenol A, xylylene glycol; and polyalkylene glycols such as diethylene glycol, triethylene glycol, dipropylene glycol, dibutanediol, and polytetramethylene glycol. Small amounts of 4-aminobenzoic acid, etc. may also be contained as components.

The melting point or softening point of a crystalline aromatic polyester is preferably 180° C. or higher. Specifically, the polymers include polyethylene terephthalate, polybutylene terephthalate, polyethylene naphthalate, polybutylene naphthalate, and polyester-based elastomers primarily composed of these.

In addition, aliphatic dicarboxylic acids selected from succinic acid, adipic acid, azelaic acid, sebacic acid, brassilic acid, cyclohexane carboxylic acid, and dimer acids may be even used as dicarboxylic acid components in a range not exceeding 10 mole % in terms of mole fraction relative to the total amount of dicarboxylic acid components.

Such crystalline aromatic polyesters are hardly dissolved in cyclic esters or solvents, and so they need to be heated particularly for a long time while at elevated temperatures to prepare a homogeneous solution. Use of the method of the present invention can improve the conditions.

With the polymer (A) in the present invention, each of these polymers or a mixture of two or more species of these is usable without particular limitations.

The weight-average molecular weight (Mw) of the polymer (A) is preferably 5,000 to 300,000 and more preferably 10,000 to 20,000.

In particular, when the weight-average molecular weight exceeds 200,000, the problem of a pressure loss increase appears remarkably, on which the present invention can have a greater effect.

The melt viscosity of a polymer (A) under charge and mixing conditions (temperature, shear rate, etc.) is preferably 5,000 to 500,000 poise, more preferably 10,000 to 200,000 poise.

For cellulose esters, an ester with 43 to 65% of the contained hydroxyl groups esterified is preferable in terms of compatibility.

The amounts of hydroxyl group and carboxylic acid present at the crystalline aromatic polyester terminals, etc., or the molecular weight thereof affects blocking of the copolymer obtained. However, both ring opening polymerization and transesterification are affected by the amount of terminal hydroxyl groups, and the temperature dependency of each reaction and the order of the terminal hydroxyl group, etc. are close in both reactions, so that a method of controlling the cyclic ester concentration, which has a large affection on ring opening polymerization, in the early and final stages of reaction, or a method of control by means of catalyst species, etc. is rather appropriate. Hence, there are no particular limitations.

The present invention can also be carried out in the presence of a catalyst for polymerization. The catalyst for polymerization includes titanium compounds such as titanium chloride, tetrabutyl titanate, tetrapropyl titanate, and tetraethyl titanate; tin compounds such as stannous chloride, stannous bromide, stannous iodide, and tin 2-ethylhexoate; zinc compounds such as zinc chloride, zinc acetate, zinc stearate, zinc oxide, zinc carbonate, a basic zinc carbonate, and diethyl zinc; aluminum compounds; magnesium compounds; barium compounds; zirconium compounds; and germanium compounds or the like. These catalysts can be used singly or in combination. The amount of catalyst to be added is normally 0.001 to 1.0% in the weight ratio based on the total amount of the polymer (A) and the cyclic ester (B), and more preferably in a range of 0.01 to 0.1%.

The method of charging for the polymer (A) into a reaction vessel is not particularly limited. The feed temperature is near the reaction temperature, and particularly the feed temperature for a solid polymer is in a temperature range from the melting temperature or softening temperature to the temperature higher by 50° C. than the melting temperature or softening temperature, more preferably a temperature selected from a temperature range from the temperature higher by 5° C. than the melting point to the temperature higher by 20° C. than the melting point, and specifically it is from 125 to 300° C., more preferably from 180° C. to 260° C.

As an apparatus, an extruder or the like is used that is an apparatus having one or two or more shafts of agitation and being capable of heating and transporting. The extruder may have a gear pump, etc. placed at the outlet thereof in order to further improve the precision for feeding. In addition, separately, the polymer (A) immediately after polymerization may be even transported to a reaction vessel while keeping the polymer in a melt state.

For the polymers (A) which are a raw material, the amount of moisture in the resin is reduced to at least 1,000 ppm or less, preferably to 100 ppm or less using a usually used dryer, or the like under a reduced pressure or ventilation and further, if necessary, it is preferable that the oxygen concentration is reduced by replacement with an inert gas such as nitrogen and that re-adsorption of moisture is prevented at the same time.

The effect by the present invention shows up when the viscosity ratio of the polymer (A)/cyclic ester (B) under charge and mixing conditions exceeds 100,000, particularly remarkably when the ratio exceeds 1,000,000. In general, when this viscosity ratio is large, the mixing becomes more difficult, and also the viscosity of the polyester-based polymer (c) obtained tends to become large as well, and therefore substantially the improvement of mixing efficiency and the reduction of pressure loss are hardly satisfied simultaneously. The viscosity ratio under charge and mixing conditions is determined from each viscosity in early stages of reaction by considering the shear rate, temperature, etc.

The charge ratio of the polymer (A) to the cyclic ester (B) varies depending on the properties of a target copolymerized polymer; however, the weight ratio of the cyclic ester (B)/polymer (A) in the copolymerization of the cyclic ester (B) and a polymer (A) is normally from 99/1 to 1/99, preferably from 5/95 to 75/25, and more preferably from 10/90 to 50/50.

The polymerization temperature varies with a raw material used, but when the cyclic esters (B) include a cyclic ester, it is from 125 to 200° C., and more preferably from 150 to 190° C. When the cyclic esters are composed of lactones alone, the temperature is from 150 to 300° C., and more preferably from 180 to 250° C. In addition, it is from the temperature lower by 15° C. than the melting point or softening temperature of the polymer (A) to the temperature higher by 50° C. than that, and more preferably from the softening temperature or melting point to the temperature higher by 20° C. than that. Specifically, the polymerization temperature is from 125 to 300° C., and more preferably from 150 to 260° C. In particular, when the crystalline aromatic polyester is utilized, it is from 180 to 300° C., and more preferably from 225 to 260° C.

The conversion of the cyclic ester (B) in reaction can arbitrarily be set; however, when the conversion in the reaction is high, the polymerization rate of the cyclic ester (B) decreases, while the reactions such as the transesterification, etc. proceed, and thus particularly, use of a crystalline aromatic polyester as the polymer (A) requires paying attention to changes such as melting point decrease, etc. The conversion in the reaction is preferably from 75 to 99 mole %, and more preferably from 90 to 97.5 mole %.

The residence time (reaction time) varies depending on a raw material to be used, the ratio, reaction temperature, and a target conversion in the reaction; however, it is generally from 0.2 to 10 hours, more preferably from 0.5 to 5 hours, and still more preferably from 0.5 to 2 hours.

The maximum reaction pressure in a system is from 2 to 200 kg/cm$^2$, preferably from 2 to 50 kg/cm$^2$, and most preferably from 2 to 20 kg/cm$^2$. However it should be noted that an agitating mixer (I) may be kept under great pressure when leakage of the contents and volatile components is not such a problem.

In addition, in the first to fifth aspects of the present invention, especially subsequent to the passage of a cyclic ester through the agitating mixer (I) and prior to the passage of the ester through the static mixer, the conversion of the cyclic esters in the reaction is preferably 75 mole % or less, more preferably 50 mole % or less, and still more preferably 30 mole % or less. A high conversion in the reaction liberates heat due to shearing inside the agitating mixer (I), and thus adversely affects the physical properties of the resin.

On the other hand, in the sixth to fifteenth aspects of the present invention, particularly subsequent steps to the passage of a cyclic ester through a static mixer for use in the early reaction stage, the conversion of the cyclic esters in the reaction is preferably 75 mole % or less, more preferably 50 mole % or less, and still more preferably 30 mole % or less. When the conversion in the reaction is high, the pressure loss in the static mixer used in the early reaction stage causes a problem associated with apparatus operation.

Raw materials for polymerization to be used in the present invention are biodegradable or hydrolyzable, and therefore they are each supplied to an agitating mixer (I) in different manners while flushing the dried raw materials for polymerization with an inert gas such as nitrogen gas in order to suppress the degradation of the raw materials for polymerization on account of oxygen or moisture.

The present invention permits the self-polymerization of the polymer (A) and the cyclic esters (B) in the absence of a solvent and also enables the reaction in the presence of a solvent that does not adversely affect the polymerization reaction for the purpose of controlling the viscosity of the reaction solution.

Addition of a solvent can reduce the viscosity in a reaction system, and thus can further improve uniform mixing due to a decrease in shearing stress as well as reducing the number of mixing elements used within the reactor, which in turn enables the reduction of the pressure for gaining a flow rate necessary for mixing, thereby leading to the suppression of the degree of pressure resistance for designing the entire reactor.

Solvents that may be added to the reaction system are those which do not react with the raw materials for polymerization and polymers produced and which readily dissolve the raw materials for polymerization and the produced polymers as well as those providing easy recovery and reuse. Specific examples of usable solvents preferably include toluene, xylene, and ethylbenzene or the like.

The amount of solvent to be added to the reaction system is preferably 20 parts by weight or less with respect to 100 parts by weight of the raw materials for polymerization in a stationary state of the continuous reaction. Also, the maximum viscosity of the reaction fluid throughout the entire reaction stage is preferably controlled to be 50,000 poise or less. The amount of solvent in this range neither greatly affects the conversion in the reaction, nor decreases the molecular weight of the polymer formed.

It is to be noted that in a non-stationary state of a continuous reaction, e.g., at the start of the continuous reaction, the amount of solvent to be added to the reaction system is 20 parts by weight or more with respect to 100 parts by weight of the polymerization components consisting of monomers and/or polymers which are raw materials for polymerization. That is, the reaction is initiated in a solvent-diluted reaction system and then polymerization is started by gradually increasing the proportion of the polymerization components and the reaction temperature while watching the conditions in order to avoid a sudden polymerization reaction.

The timing of adding a solvent may be charged at the stage of raw materials, or can be charged in the polymerization stage where there is a large amount of heat liberation during the reaction for the purpose of cooling the reaction system inasmuch as a static mixer has an excellent mixing ability so that there can be readily uniformly blended a solution having a high viscosity and a solvent.

In addition, the addition to the reaction system can also be performed at the point when the viscosity of the reaction fluid is excessively increased because of a high molecular weight polymer produced in the final stage of polymerization. Additionally, when a solvent is added to a reaction system during reaction, a solvent to be added that has further dissolved therein a monomer and/or a polymer which are the raw materials for polymerization can be added to the reaction system, or a solvent having dissolved therein other additives, e.g., a molecular-weight controlling agent, plasticizer and antioxidant can be added to the reaction system as well.

The pressure within a polymerization reaction system having added thereto a solvent varies depending on raw materials for polymerization to be used; however, it is generally from 2 to 15 kg/cm$^2$, normally 10 kg/cm$^2$ or less, and the residence time (reaction time) in the polymerization reaction system is generally from 0.2 to 10 hours.

When a column-type agitating mixer portion having an agitating shaft is free from leaking of seal portions in a shaft, etc. depending upon an apparatus shape, the operation may be carried out under the above-mentioned or higher pressure.

According to the present invention, the conversion of a monomer (B) in reaction being 75 mole % or more is suitable, and the other unreacted monomers are reused as raw materials after recovery by means of an apparatus for removing low-boiling materials or the like. The recovered raw material monomers can continuously be returned to a vessel for charging raw materials, or they can be utilized for reaction after the monomers are once stored in a cushion tank and then mixed with raw material monomers in the tank.

Although a reaction has been conducted with a conversion of reaction of 75 mole % or greater, the residual monomers or oligomers are reactive and desirably removed because they affect the storage stability when remaining in the product polymer and also because they are not preferable in terms of safeness to human and odors.

As a result, in order to recover and reuse unreacted monomers and also to modify the physical properties of a polymer, the present invention separates and recovers the residual monomers, oligomers or solvent of the formed polymer in the apparatus for removing low-boiling materials connected to the continuous reactor after polymerizing the polyester-based polymer by use of a continuous reactor. The recovered solvent is separated from the recovered monomers, optionally stored in a storage tank, and optionally reused.

A method for removing low-boiling materials is not particularly limited if it can keep a formed polymer after completion of polymerization under heated and reduced-pressure conditions or under gas passage and take out low-boiling components out of the gas phase portion thereof to the outside of the system. Specifically, a method of removing low-boiling materials includes heating and melting a formed polymer subsequent to completion of polymerization for the purpose of first providing the polymer with sufficient flowability and providing the evaporation heat of the low-boiling materials in a pre-heater communicated with the reactor. In this case, as a heat exchanger, a vertical multi-tube heat exchanger or static mixer equipped with a heat exchanger is usable as well.

For an apparatus for removing low-boiling materials, a simple flush tank or vertical device for removing low-boiling materials enables removal of low-boiling materials in one stage for removing residual monomers and/or solvent. Preferably, removal of low-boiling materials is performed by means of a two-stage combination of low-boiling material removing baths. In other words, removal of low-boiling materials is conducted at a degree of vacuum of 20 to 150 mmHg in a first-stage apparatus for removing low-boiling materials, and unreacted monomers are separated and recovered by conducting removal of low-boiling materials in a second-stage apparatus for removing low-boiling materials at a further higher degree of vacuum of, for example, 0.1 to 20 mmHg. A normal vacuum apparatus can be used. For example, a flush type apparatus for removing low-boiling materials is usable in the first stage and a thin-film type apparatus for removing low-boiling materials can be used in the second stage.

After removal of low-boiling materials, the polymer is discharged from the bottom of the apparatus for removing the low-boiling materials using a gear pump, or the like and then can be pelletized, or the polymer can be extruded as a plurality of linear polymers with a diameter of 0.3 to 3 mm by means of a ventilation type extruder and then continuously supplied into an apparatus for removing low-boiling materials.

The polymer having completed the low-boiling material removal is taken out using a gear pump and can directly be pelletized, or is optionally mixed with an additive via an extruder, static mixer, etc. and can then be pelletized.

Unreacted monomers are further cooled and recovered with a condenser, and can again be supplied to reaction along with new raw material monomers.

The recovered unreacted monomers, after the continuous reaction has reached a stationary state, are continuously returned to a vessel for charging the raw materials and continuously used in reaction. In addition, the solvent that was separated and recovered is cooled and recovered using a condenser, stored in a tank for a solvent and optionally reused.

For the prevention of remaining of the raw material polymer (A) in the formed polyester-based polymer (C), the charging ratio of the raw material polymer (B) to the raw material polymer (A) is preferably made large and unreacted monomers (B) may be recovered and reused. Continuous use of the apparatuses for removing low-boiling materials permits the content of remaining monomers in the polyester-based polymer (C) to be 1% by weight or less.

Although the amount of the polymer (C) to be obtained depends on a weight-average molecular weight of raw material polymers and the constitution ratio of raw materials, the weight-average molecular weight thereof is from 5,000 to 500,000, more preferably from 10,000 to 300,000. In particular, when the weight-average molecular weight exceeds 20,000, the problem of a rise in pressure loss is clearly revealed, and thus it can be seen that the present invention is highly effective. The melt viscosity under operational conditions (temperature, shear rate) of the polymer (C) is from 5,000 to 500,000 poise, more preferably from 10,000 to 200,000 poise.

In addition, the present invention can also provide a polymer of a low molecular weight using, depending on the purpose, a molecular-weight controlling agent (chain transfer agent) such as water, lactic acid, glycolic acid, another alcohol or carboxylic acid, and a compound having three or more functional groups selected from carboxyl group, hydroxyl group, and other ester-forming groups.

Furthermore, in the present invention there may be used generally used other additives for polymers such as an antioxidant, ultraviolet absorbent, and plasticizer without any special limitations and these additives may be added to a reaction system after being dissolved in a solvent during reaction.

Additionally, during a continuous reaction in the present invention, in addition to the above-mentioned copolymerizable components, isocyanates, acid anhydrides, epoxy compounds, etc. can further be added, the addition being capable of modifying the performance of the polymer.

In the first to fifth aspects of the present invention there is used a reactor comprising a column-type agitating mixer having two or more shafts of agitation and a static mixer and, in the sixth to fifteenth aspects of the present invention there is used a continuous reactor having two or more types of static mixers combined in series, and these aspects relate to a method for continuously producing a polyester-based polymer having a melt viscosity of 500,000 poise or less and having a weight-average molecular weight of 10,000 or more, which involves continuously feeding the cyclic ester (B) and the polymer (A) into each reactor, and preferably continuously reacting them at a one-pass conversion in reaction of 75% or more in the presence or absence of solvent in a state where the reactants do not make contact with oxygen and moisture in the atmosphere at all.

The present invention is particularly suited for producing block or graft copolymers composed of two or more polymer components, the polymers produced by the invention are used for many applications as compatibilizing agents, adhesives, elastomers, shape memory resins, and a variety of molding resins.

It is to be noted that the method of reacting raw materials after previously preparing a homogeneous solution by melt-mixing or by using a solvent, etc. under heating conditions of the melting point or higher of any of the raw materials cannot readily mix the polymer (A) and the cyclic ester (B) in a short time, and requires a long period of time as well as normally needing heating conditions, and thus it is economically disadvantageous and cannot completely prevent the progress of reactions during dissolution, which becomes a cause of instabilities of the product properties. Even if the method utilizes a continuous process and is devised in such a way that the degree of progress during dissolution is kept constant, the dissolving step by means of a batch-wise agitating reaction vessel that requires a long time period extends the residence time distribution, and therefore is not preferable.

EXAMPLES

The present invention will be discussed in detail hereinafter by means of Examples and Comparative Examples; however, the present invention is by no means limited to these.

In addition, "%" and "parts" all express "% by weight" and "parts by weight", respectively, unless otherwise indicated.

Conditions used for measuring analytical and physical properties are shown below.

(1) Melting Point

Melting peak temperatures (Tpm) and melting initiation temperatures (Tim), and melting termination temperatures (Tem) were evaluated as melting points and melting point dispersions, respectively, by means of a differential scanning calorimeter (DSC) in accordance with JIS K 7121. For resins after polymerization, as described in Examples and Comparative Examples, low melting point peaks attributable to the block portions of polycaprolactone homopolymers or polycaprolactones were not observed at all.

(2) Amount of Unreacted Lactone

Measurements were performed by means of a gas chromatograph GC-14A available from Shimadzu Corp. A glass-made column with an inside diameter of 3.2 mm and a length of 2.1 m was packed with 10%/uniport HPS of PEG20M. A sample (0.5 g) and diphenyl ether (0.1 g) as the internal standard material were precisely measured and dissolved in hexafluoroisopropanol (HFIP, 20 g). The sample was measured at a constant temperature of 180° C. using nitrogen as a carrier, and the obtained result was calculated by means of the internal standard method to determine the amount (% by weight) of unreacted lactone.

(3) Weight-Average Molecular Weight

It was determined using GPC in standard PMMA equivalent. GPC measurements were performed at a column temperature of 50° C. at a flow rate of 1.0 ml/min using as columns Shodex GPC HFIP-800P, HFIP-805P, HFIP-804P and HFIP-803P available from Showa Denko Co., Ltd., using as a detector RID-6A available from Shimadzu Corp., and using HFIP as an eluate.

(4) Raw Material

Polymer (A): Polybutylene terephthalate (a product of Polyplastics Co. Ltd., melt viscosity of 25,000 poise at 240° C. at 10/second) was dried using a hopper dryer (using air with a dew point of −40° C.) till the moisture concentration thereof was 40 ppm or less.

Cyclic esters (B): ε-Caprolactone (5) Residual Monomer Concentration

From the time point when a given period of time had passed after a given amount of ε-caprolactone was supplied, sampling of the polyester-based polymer obtained was performed 5 times every 30 minutes. The average value of each monomer concentration was taken as the residual monomer concentration, and the maximum and minimum values are given.

Comparative Example 1

A twin-screw co-rotating intermeshing extruder TEX30 (inside diameter of 32 mm, L/D=42) available from Japan Steel Works Ltd., was used as a reactor.

The aforementioned polybutylene terephthalate was supplied to the above-mentioned reactor at 4.8 kg/hour using a screw feeder. Thereafter, ε-caprolactone was supplied at the vent port using a plunger pump at 3.2 kg/hour.

For screw arrangement of the reactor, a screw paddle was disposed immediately beneath the supply port of polybutylene terephthalate, a kneading disc paddle immediately after the port, a screw paddle near the supply vent port of ε-caprolactone, and then a kneading disc paddle was placed, and finally a screw paddle was disposed.

The heating temperatures were 190° C. and 220° C. from the side closer to the supply port, and other cylinders were all set at 230° C. Reaction was performed at a screw rotation speed of 100 rpm. The average residence time (measured after coloring by addition of Carbon Black. The same for the following.) was 7 minutes. The resin temperature near the dies had risen to 253° C.

Subsequently, the polyester-based polymer obtained was discharged into a strand form out of the dies, and then pelletized after being cooled by water. Pellet was analyzed and measured for a variety of properties and physical properties. The results are given in Table 1. Sampling for measuring residual monomers was conducted from an hour after supplying a specified amount of ε-caprolactone.

Comparative Example 2

Preparation was performed as in Comparative Example 1 except that the screw rotation speed was set at 50 rpm and that the heating temperatures were 190° C. and 230° C. from the side closer to the supply port. The residence time was 10 minutes, and the resin temperature near the dies was 238° C. The results are given in Table 1.

Comparative Example 3

Production was carried out as in Comparative Example 2 except that a twin-screw co-rotating intermeshing extruder TEX30 (inside diameter of 32 mm, L/D=28) available from Japan Steel Works Ltd was used as a reactor.

The residence time was 2.5 minutes. The resin temperature near the dies was 230° C. The polyester-based polymer obtained was low in conversion in the reaction and was not capable of being taken out in a strand form; however, the measurement results are given in Table 1.

Comparative Example 4

KRC kneader S2 (inside diameter of 50 mm, L/D=9) available from Kurimoto Ltd. was used as a reactor. The aforementioned polybutylene terephthalate was continuously supplied at the raw material supply port of the above-mentioned reactor at a resin temperature of 240° C. using a single screw extruder with a 30 mm diameter and using a gear pump. On the other hand, $\epsilon$-caprolactone was delivered via a plunger pump and heated to 210° C. through a heat exchanger and then was supplied at the vent port of the reactor. Supplying rates of the raw material were 600 g/hour for polybutylene terephthalate and 400 g/hour for $\epsilon$-caprolactone. A catalyst only contained in the polybutylene terephthalate was used.

For screw arrangement, screw paddles were placed near the raw material supply port and the vent port, and at all the other sites were disposed flat type kneading disc paddles. The heating temperatures were all set at 230° C. and the reactants were continuously supplied for addition reaction at an agitating rotation speed of 50 rpm. The average residence time was 40 minutes. The resin temperature near the dies was 235° C. Then, the polymer was discharged in a strand form out of the dies, and cut after cooling by water to obtain a polyester-based polymer. The measurement results are given in Table 1. Sampling for measuring residual monomers was conducted from three hours after applying a specified amount of $\epsilon$-caprolactone.

Comparative Example 5

A polymerizing apparatus having lattice-shaped blades (inside capacity of 6 L) available from Hitachi Ltd. was used as a reactor. The aforementioned polybutylene terephthalate was continuously supplied at the raw material supply port at a resin temperature of 240° C. using a single screw extruder with a 30 mm diameter and using a gear pump. On the other hand, $\epsilon$-caprolactone was delivered via a plunger pump and heated to 210° C. through a heat exchanger and then was supplied at the raw material supply port. The raw material supply rates were 5.4 kg/hour for polybutylene terephthalate and 3.6 kg/hour for $\epsilon$-caprolactone. A catalyst only contained in the polybutylene terephthalate was used.

The heating temperatures were all set at 230° C. and the reactants were continuously supplied for addition reaction at an agitating rotation speed of 10 rpm. The average residence time was 45 minutes. The resin temperature near the dies was stably kept at 230 to 231° C. Then, the polymer was discharged in a strand form out of the dies, and cut after water cooling to yield a polyester-based polymer. The measurement results are given in Table 1. Sampling for measuring residual monomers was conducted from three hours after applying a specified amount of $\epsilon$-caprolactone.

Example 1

The extruder TEX30 used in Comparative Example 1, to the outlet of which a static mixer SMX (inside diameter of 3 inches, length of 1200 mm) available from Sulzer Corp., was connected was used as a reactor. The aforementioned polybutylene terephthalate was supplied at 4.8 kg/hour using a screw feeder. Thereafter, E-caprolactone was supplied at the vent port using a plunger pump at 3.2 kg/hour.

For screw arrangement, a screw paddle was disposed immediately beneath the supply port of polybutylene terephthalate, a kneading disc paddle immediately after the port, a screw paddle near the supply vent port of $\epsilon$-caprolactone, and then a kneading disc paddle was placed, and finally a screw paddle was disposed. The heating temperatures were 190° C. and 220° C. from the side closer to the supply port, and other cylinders were all set at 230° C. Addition reaction was performed at a screw rotation speed of 50 rpm. In addition, the static mixer section was set at a heating temperature of 230° C. The average residence time for the whole reactor was 43 minutes. The resin temperature near the dies was stably kept at 230 to 231° C. Then, the polymer was discharged in a strand form out of the dies, and cut after water cooling to obtain a polyester polymer. The measurement results are given in Table 1. Sampling for measuring residual monomers was conducted three hours after applying a specified amount of $\epsilon$-caprolactone.

Example 2

The kneader S2 used in Comparative Example 4, having connected thereto the static mixer SMX used in Example 1 by way of a gear pump was used as a reactor. The aforementioned polybutylene terephthalate was continuously supplied at the raw material supply port of the kneader S2 at a resin temperature of 240° C. using a single screw extruder with a 30 mm diameter and using a gear pump. On the other hand, $\epsilon$-caprolactone was delivered via a plunger pump and heated to 210° C. through a heat exchanger and then was supplied at the vent port of the kneader S2. The supplying rates of raw materials were 4.8 kg/hour for polybutylene terephthalate and 3.2 kg/hour for $\epsilon$-caprolactone. A catalyst only contained in the polybutylene terephthalate was used.

For screw arrangement, screw paddles were placed near the raw material supply port and the vent port, and all the other sites were disposed with helical type kneading disc paddles having a delivery function. The heating temperatures all were set at 230° C. and the reactants were continuously supplied for addition reaction at an agitating rotation speed of 50 rpm. The average residence time for the whole reactor was 45 minutes. The resin temperature near the dies was stably kept at 230 to 231° C. Then, the polymer was discharged in a strand form out of the dies, and cut after cooling by water to obtain a polyester polymer. The measurement results are given in Table 1. Sampling for measuring residual monomers was conducted three hours after applying a specified amount of $\epsilon$-caprolactone.

TABLE 1

| | Residual monomer concentration (wt %) | | | Molecular weight (×1000) | | Melting Point T pm (° C.) | Melting point dispersion T em − T im (° C.) |
|---|---|---|---|---|---|---|---|
| | Average Value | Minimum value | Maximum value | Mn | Mw | | |
| Example 1 | 2.0 | 1.9 | 2.1 | 53 | 112 | 206 | 19 |
| Example 2 | 1.9 | 1.9 | 2.0 | 54 | 114 | 205 | 20 |
| Comparative Example 1 | 8.8 | 8.0 | 9.9 | 42 | 105 | 215 | 18 |
| Comparative Example 2 | 7.2 | 6.5 | 7.7 | 45 | 109 | 211 | 22 |
| Comparative Example 3 | 30.0 | — | — | — | — | 221 | — |
| Comparative Example 4 | 2.4 | 2.1 | 2.7 | 39 | 94 | 206 | 25 |
| Comparative Example 5 | 3.3 | 3.0 | 3.9 | 39 | 110 | 204 | 28 |

Example 3

A continuous polymerization apparatus was assembled by connecting in series a static mixer SMX (pressure loss ratio 38) with an inside diameter of ½ inch (1.27 cm) and a length of 68 cm (units of 37 cm and 31 cm joined in series) available from Sulzer Corp. as the early reaction stage static mixer and a Kenics type static mixer (pressure loss ratio 7) with an inside diameter of ¾ inch (1.91 cm) and a length of 100 cm (two units of 50 cm joined in series were used) as the final reaction stage static mixer.

X (early reaction stage: final reaction stage) calculated using the actual inside diameters of these was 16.9, Y (early reaction stage) was 1,600 and the total value of Y values of all the static mixers was 1,930. In the following Table 2, X (early reaction stage: final reaction stage) is indicated as X, and Y (early reaction stage) is expressed as Y.

Polybutylene terephthalate (a product of Polyplastics Corp., melt viscosity of 25,000 poise at 240° C. at 10/second) as the polymer (A) was dried using a hopper dryer (using air with a dew point of −40° C.) till the moisture concentration thereof was 40 ppm or less, and then was continuously supplied to static mixer in the early reaction stage at a resin temperature of 240° C. using a single screw extruder with a 30 mm diameter and using a gear pump.

On the other hand, ε-caprolactone as a cyclic ester (B) was delivered using a plunger pump and heated to 210° C. via a heat exchanger and then continuously supplied to static mixer in the early reaction stage.

The charging ratios of raw materials are 300 g/hour for polybutylene terephthalate and 200 g/hour for ε-caprolactone. A catalyst only contained in the raw material polybutylene terephthalate was used. The reactants were continuously bulk-polymerized at a reaction temperature of 230° C. The resin temperature near the dies placed at the outlet of the continuous polymerization apparatus was stably kept at 230 to 231° C.

Subsequently, the polyester polymer obtained was discharged in a strand form out of the dies, and then pelletized after being cooled by water. The pellet was analyzed and measured for a variety of properties and physical properties. The results are given in Table 3.

It is to be noted that in the early stage of reaction, the amount of ε-caprolactone to be supplied was set at 1/10 of the assumed amount initially, and then it was set at a specified amount, and subsequently polybutylene terephthalate was set at a specified amount. A while after the polybutylene terephthalate was set at a specified amount, the polymer discharged from the dies was capable of being cut in a strand form. Subsequently, the residual monomer concentration in the polymer was analyzed at regular intervals and the time required for making the concentration stabilize within an error range of less than 10% was regarded as the stabilization time. It was ensured that the residual monomer concentration was stabilized at 2.0 wt % in 1.3 hours. From the time point when three hours had passed after a given amount of polybutylene terephthalate was supplied, sampling was performed 5 times every 30 minutes. The average value of each monomer concentration was taken as the residual monomer concentration, and the maximum and minimum values are given.

Examples 4 to 12, Comparative Examples 6 and 7

Polymerization was likewise carried out as in Example 3 with the exception that the static mixers indicated in Table 2 each were used in the early reaction stage, the intermediate reaction stage, and the final reaction stage, respectively. The polymers obtained were subjected to various measurements. The results are given in Table 3.

In a combination of static mixers in each reaction stage, volume was adjusted in such a way that the total of residence time of each reaction stage is almost equal to each other. The length of the static mixer of each reaction stage shown in Table 2 indicates the total length of static mixers constituting the stage, as in Example 3.

It is to be noted that in Comparative Example 7, after setting polybutylene terephthalate at a specified amount, the pressure loss gradually increased, and thus the operation was forced to stop.

Comparative Example 8

A twin-screw co-rotating intermeshing extruder TEX30 (inside diameter of 32 mm, L/D=42) available from Japan Steel Works Ltd. was used in place of a static mixer as a reactor.

After drying, polybutylene terephthalate was supplied at 4.8 kg/hour using a screw feeder. Then, ε-caprolactone was supplied at the vent port at 3.2 kg/hour using a plunger pump.

For screw arrangement, a kneading disc paddle was disposed immediately after the polybutylene terephthalate supply port, a screw paddle near the supply vent port of ε-caprolactone, and then further a kneading disc paddle was placed, and finally a screw paddle was disposed.

The heating temperatures were 190° C. and 220° C. from the side closer to the supply port, and other cylinders were all set at 230° C. Addition reaction was performed at a screw rotation speed of 100 rpm. The average residence time observed after coloring by addition of Carbon Black was 7 minutes. The resin temperature near the dies was increased up to 253° C. Then, the polyester-based polymer was discharged in a strand form from the dies, and pelletized after being cooled by water. The results are shown in Table 3.

After supply of a given amount of ε-caprolactone, the residual monomer concentration was analyzed at regular intervals and the time required for making the concentration stabilize within an error range of less than 10% was regarded as the stabilization time. It was ensured that the residual monomer concentration was stabilized at 8.8% by weight in 0.2 hour.

From the time point when one hour had passed after a given amount of ε-caprolactone was supplied, sampling was performed 5 times every 30 minutes. The average value of each monomer concentration was taken as the monomer concentration, and the maximum and minimum values are given.

Comparative Example 9

Preparation was performed as in Comparative Example 8 except that the screw rotation speed was set at 50 rpm and that the heating temperatures were 190° C. and 230° C. from the side closer to the supply port. The residence time was 10 minutes, and the resin temperature near the dies was 238° C. The results are given in Table 3.

TABLE 2

|  | Early reaction stage | | Intermediate reaction stage | | Final reaction stage | | X value | Y value | Total value of Y |
|---|---|---|---|---|---|---|---|---|---|
|  | Kind | Length (cm) | Kind | Length (cm) | Kind | Length (cm) |  |  |  |
| Example 3 | A | 68 | — | — | B | 100 | 16.9 | 1600 | 1930 |
| Example 4 | A | 37 | C | 30 | B | 100 | 16.9 | 870 | 1330 |
| Example 5 | A | 31 | C | 30 | B | 100 | 16.9 | 730 | 1190 |
| Example 6 | A | 19 | C | 30 | B | 100 | 16.9 | 450 | 910 |
| Example 7 | A | 13 | C | 45 | B | 100 | 16.9 | 310 | 830 |
| Example 8 | A | 7 | C | 45 | B | 100 | 16.9 | 170 | 690 |
| Example 9 | A | 68 | C | 30 | D | 50 | 8.3 | 1600 | 2430 |
| Example 10 | A | 68 | — | — | E | 100 | 14.1 | 1600 | 1980 |
| Example 11 | F | 50 | C | 30 | B | 100 | 8.1 | 280 | 730 |
| Example 12 | F | 25 | C | 45 | B | 100 | 8.1 | 140 | 660 |
| Comparative Example 6 | C | 60 | — | — | B | 100 | 3.1 | 260 | 590 |
| Comparative Example 7 | A | 68 | — | — | G | 93 | 2.6 | 1600 | 3330 |

Kinds of static mixers
A: SMX, diameter of ½ inch
B: Kenics type, diameter of ¾ inch
C: Kenics type, diameter of ½ inch
D: SMX, diameter of 1 inch
E: SMXL, diameter of ¾ inch
F: Kenics type, diameter of ⅜ inch
G: SMX, diameter of ¾ inch

TABLE 3

|  | Stabilization time (Hr) | Average value of residual concentration (wt %) | Minimum value of residual concentration (wt %) | Maximum value of residual concentration (wt %) | Mn (×1000) | Mw (×1000) | Melting Point T pm (° C.) | Melting point dispersion T em − T im (° C.) |
|---|---|---|---|---|---|---|---|---|
| Example 3 | 1.3 | 2.0 | 1.9 | 2.1 | 53 | 112 | 206 | 19 |
| Example 4 | 1.2 | 1.9 | 1.9 | 2.0 | 54 | 114 | 205 | 20 |
| Example 5 | 1.3 | 2.0 | 1.9 | 2.2 | 53 | 112 | 206 | 19 |
| Example 6 | 1.4 | 2.1 | 2.0 | 2.2 | 54 | 113 | 206 | 20 |
| Example 7 | 1.5 | 2.2 | 1.8 | 2.4 | 53 | 111 | 206 | 20 |
| Example 8 | 1.6 | 2.4 | 2.2 | 2.7 | 51 | 112 | 207 | 20 |
| Example 9 | 1.3 | 2.0 | 1.9 | 2.1 | 58 | 115 | 206 | 19 |
| Example 10 | 1.3 | 2.1 | 1.9 | 2.2 | 53 | 111 | 206 | 20 |
| Example 11 | 1.5 | 2.4 | 2.1 | 2.6 | 51 | 113 | 206 | 21 |
| Example 12 | 1.7 | 2.5 | 2.2 | 2.8 | 51 | 112 | 206 | 22 |
| Comparative Example 6 | 2.2 | 3.5 | 2.9 | 4.3 | 49 | 113 | 207 | 24 |
| Comparative Example 7 | — | — | — | — | — | — | — | — |

TABLE 3-continued

|  | Stabilization time (Hr) | Average value of residual concentration (wt %) | Minimum value of residual concentration (wt %) | Maximum value of residual concentration (wt %) | Mn (×1000) | Mw (×1000) | Melting Point T pm (° C.) | Melting point dispersion T em − T im (° C.) |
|---|---|---|---|---|---|---|---|---|
| Comparative Example 8 | 0.2 | 8.8 | 8.0 | 9.9 | 42 | 105 | 215 | 18 |
| Comparative Example 9 | 0.4 | 7.2 | 6.5 | 7.7 | 45 | 109 | 211 | 22 |

In Comparative Example 7, the pressure loss increased so the operation was stopped.

INDUSTRIAL APPLICABILITY

According to the present invention, when producing a high molecular weight polyester-based polymer by continuously subjecting to ring opening polymerization a polymer (A) having a hydroxyl groups and/or ester linkages and one or more species of cyclic esters (B), the difficulty of uniform blending due to the reactants becoming highly viscous, the difficulty of heat removal, and the problem of an increase in pressure loss are solved, thus leading to continuous production of a polyester-based polymer being stable and having excellent quality.

The invention claimed is:

1. A process of producing a polyester-based polymer, characterized by comprising continuously feeding a polymer (A) having hydroxyl groups and/or ester linkages and one or more species of cyclic esters (B) into a reactor comprising a column-shaped agitating mixer having two or more shafts of agitation and a static mixer connected to an outlet thereof and then subjecting them to ring opening polymerization, to obtain a copolymer (C)
wherein the agitating mixer has (i) a combination of a screw paddle and a kneading disk paddle, (ii) a combination of kneading disk paddles, (iii) glasses blades or (iv) lattice blades.

2. A producing process according to claim 1, wherein the polymer (A) is a crystalline aromatic polyester.

3. A producing process according to claim 1, wherein the cyclic ester (B) is a lactone.

4. A producing process according to claim 3, wherein the lactone is ε-caprolactone.

5. A producing process according to any of claims 1 to 4, wherein the conversion of reaction of the cyclic ester (B), is 75 mole % or less after passing through the column-shaped agitating mixer having two or more shafts of agitation and before passing through the static mixer, and it is 75 mole % or more after passing through the static mixer.

6. A process of continuously producing a polyester-based polymer, characterized by continuously feeding a polymer (A) having hydroxyl groups and/or ester linkages and one or more species of cyclic esters (B) into a continuous reactor having a static mixer and then subjecting them to ring opening polymerization to obtain a copolymer (c) in which:
the continuous reactor, whose mixer(s) consist(s) essentially of a static mixer, at least comprises a static mixer (SM(i)) for use in an early stage of reaction and a static mixer (SM(e)) for use in a final stage of reaction, the static mixer (SM(e)) being connected to SM(i) in series and being a type different from that of SM(i);
the X (i:e) value is 4 or greater, the value being calculated by substituting the pressure loss ratios Zi of SM(i) and Ze of SM(e) and the inside diameters Di of SM(i) and De of SM(e) into Equation (1) below:

$$X(i:e) = (Zi \times De^4)/(Ze \times Di^4) \tag{1}$$

7. A continuously manufacturing process according to claim 6, wherein the X(i:e) is 10 or greater.

8. A continuously manufacturing process according to claim 6, wherein the Y(i) value is from 200 to 2,000, the value being calculated by substituting the pressure loss ratio Z(i), the mixer length L(i) and the inside diameter D(i) of SM(i) into Equation (2) below:

$$Y(i) = Z(i) \times L(i)/D(i) \tag{2}$$

9. A continuously manufacturing process according to claim 8, wherein the Y(i) is from 500 to 1,000.

10. A continuously manufacturing process according to any of claims 6 to 9, wherein a static mixer (SM(m)) for use in the intermediate stage of reaction is optionally placed, between the SM (i) and the SM (e).

11. A continuously manufacturing process according to any of claims 6 to 9, wherein one or more or all of the SM(i), the SM(m) placed as required, and the SM(e) comprise a plurality of static mixers.

12. A continuously manufacturing process according to any of claims 6 to 9, wherein for static mixers [SM(r), (r=1 to n)] to the total of n pieces, constituting the SM (i), the SM(m) optionally placed, and the SM(e): the total value of Yr calculated using Equation (2) [i.e., ΣYr=ΣZr×Lr/Dr, (the range of Σ being r=1 to n)] is 5,000 or less.

13. A continuously manufacturing process according to any of claims 6 to 9, wherein the polymer (A) is a crystalline aromatic polyester.

14. A continuously manufacturing process according to any of claims 6 to 9, wherein the cyclic ester (B) is a lactone.

15. A continuously manufacturing process according to claim 14, wherein the lactone is ε-caprolactone.

* * * * *